United States Patent
Moine et al.

(10) Patent No.: US 9,719,552 B2
(45) Date of Patent: Aug. 1, 2017

(54) CARABINER

(71) Applicant: ZEDEL, Crolles (FR)

(72) Inventors: Julien Moine, La Terrasse (FR); Aurèlie Bergez, Gières (FR)

(73) Assignee: ZEDEL, Crolles (FR)

( * ) Notice: Subject to any disclaimer, the term of this patent is extended or adjusted under 35 U.S.C. 154(b) by 0 days.

(21) Appl. No.: 15/080,119

(22) Filed: Mar. 24, 2016

(65) Prior Publication Data
US 2016/0281766 A1 Sep. 29, 2016

(30) Foreign Application Priority Data
Mar. 24, 2015 (FR) ...................................... 15 52409

(51) Int. Cl.
*F16B 45/02* (2006.01)
*A62B 35/00* (2006.01)
*A63B 29/02* (2006.01)

(52) U.S. Cl.
CPC .......... *F16B 45/02* (2013.01); *A62B 35/0037* (2013.01); *A63B 29/02* (2013.01); *Y10T 24/45277* (2015.01); *Y10T 24/45319* (2015.01); *Y10T 24/45335* (2015.01)

(58) Field of Classification Search
CPC ...... F16B 45/02; A62B 35/0037; A63B 29/02
See application file for complete search history.

(56) References Cited

U.S. PATENT DOCUMENTS

| 4,019,609 A * | 4/1977 | Wagner ................... A62B 1/06 182/5 |
| 2013/0104374 A1 | 5/2013 | Schlangen et al. | |

FOREIGN PATENT DOCUMENTS

| EP | 2 538 095 A1 | 12/2012 | |
| GB | EP 0976936 A1 * | 2/2000 | ............. F16B 45/02 |
| GB | 2481800 A | 1/2012 | |
| WO | 2005/073571 A1 | 8/2005 | |

* cited by examiner

Primary Examiner — Robert J Sandy
(74) Attorney, Agent, or Firm — Oliff PLC

(57) ABSTRACT

The invention relates to a carabiner including a metal body, and a gate rotatably assembled to a first end of the metal body between a closed position and an open position of the carabiner, the gate being in contact with a second end of the metal body when the carabiner is in closed position. The carabiner is provided with a separation bar fastened to the metal body and configured to define two distinct confinement areas. The bar is assembled by clipping onto the metal body at first and second opposite ends of the bar, the first end comprising a first fastener totally surrounding the metal body, and the second end comprising a second fastener totally surrounding the metal body. The separation bar being configured to authorize the opening of the gate when the first and second fasteners surround the metal body.

16 Claims, 2 Drawing Sheets

CARABINER

BACKGROUND OF THE INVENTION

The invention relates to a carabiner used in climbing and in works at heights.

STATE OF THE ART

Carabiners are currently used in climbing and in professional activities where requiring a roping up. They are for example used to connect a safety device to the bridging hasp of a rope harness or to a wall.

Carabiners generally have an asymmetrical shape, an area of the carabiner being especially adapted to cooperate with a safety device, while another area is more adapted for the use of a rope, for example.

However, during the use, it is not unusual for the carabiner to flip, for example when a user belays another person climbing a wall. Indeed, during a belaying, the belay system formed of the carabiner and of the safety device moves as the user slides the safety device along the belay rope. Thus, the relative position of the safety device with respect to the carabiner may be modified, adversely affecting the proper operation of the belay system.

To overcome this problem, some carabiners may be provided with a bar fastened to the carabiner to separate the space defined inside of the carabiner into two distinct areas. Its function is to prevent the motion of a device—for example, a safety device—beyond the area defined by the bar.

Some carabiners have a bar rotatably assembled with respect to the body of the bar and block the carabiner gate to prevent an unwanted opening thereof. However, this type of device has the disadvantage of being bulky and of not being convenient since there no longer is a separation of the space defined inside of the carabiner when the latter is in open position.

Other carabiners provided with a bar are known. Some bars are fastened to the carabiner by one of their ends, for example, by introducing at least one of their ends into a hole made in the carabiner. Since one or a plurality of openings have been formed in the carabiner, the latter may be weakened, and specific precautions have to be taken to implement its manufacturing process.

The bar may be coupled to a spring to be able to be placed back in a predetermined position after having been moved.

When the bar is only fastened at a single one of its ends to the carabiner, the connection of a device to the carabiner is eased, but this has the disadvantage that the device may also inadvertently come out of the area predefined by the bar.

The fact of forming a hole in the carabiner to house the end of the bar may also be prejudicial. This may indeed weaken the carabiner if it is not done with the adequate degree of accuracy.

SUMMARY OF THE INVENTION

An object of the invention is to provide a carabiner configured to cooperate with a safety device permanently kept in a predefined area of the carabiner.

To achieve this, the carabiner comprises:
a metal body,
a gate rotatably assembled to a first end of the metal body between a closed position and an open position of the carabiner, the gate being in contact with a second end of the metal body when the carabiner is in closed position,
a separation bar secured to the metal body and configured to define two distinct confinement areas.

Advantageously, the bar is assembled by clipping onto the metal body at first and/or second opposite ends of the bar. The first and second ends respectively comprise first and second fasteners surrounding the metal body. The first fastener and/or the second fastener totally surround a section of the metal body.

According to an aspect of the invention, the first and/or the second fasteners are one-piece to gain compactness.

According to another aspect of the invention, the first fastener comprises a first hollow section and a first entrance enabling to introduce the metal body into the first fastener to allow a clipping of the bar onto the metal body by elastic deformation of the first fastener.

It is advantageous to provide for the bar to comprise at least one first hole having an axis orthogonal to the first entrance and for the carabiner to comprise at least one first connection element capable of cooperating with the first hole to close the first entrance and firmly hold the bar on the metal body.

To provide a good mechanical performance, it is advantageous to provide for the first entrance to be defined by a slot facing an inner portion of the metal body.

It is further possible to provide a carabiner where the second fastener defines a ring having no means for opening said ring.

In an alternative embodiment, the second fastener comprises a second hollow section and a second entrance enabling to introduce the metal body into the second fastener, to allow a clipping of the bar onto the metal body by elastic deformation of the second fastener.

It is possible to provide for the first and second connection elements to be selected from among screws, rivets, self-clinching studs, or a protruding area arranged on a first side of the first and/or second entrances and configured to cooperate with a hole arranged in a second side opposite to the first and/or second entrances.

It is further possible to envisage for the first and/or second fasteners to be provided with a device preventing a rotation relative to the metal body. More particularly, it is advantageous to provide for the first and/or second fasteners to respectively comprise first and second hollow sections having a shape complementary to that of the metal body.

The bar further comprises a central portion connecting the first and second fasteners, the central portion being configurable so that the locking element can bear against it when the locking element abuts against a central portion of the metal body.

The invention also relates to a belay system provided with a safety device and with a carabiner having the previously-mentioned characteristics.

The invention finally relates to a method of installing a safety device on a carabiner having the previously-mentioned characteristics. The method may comprise the steps of:
  providing the carabiner connected to a hole of connection of the safety device,
  introducing the metal body into the first and second fasteners to clip the bar onto the carabiner and confine the safety device in a predefined area.

BRIEF DESCRIPTION OF THE DRAWINGS

The foregoing and other features and advantages of the present invention will more clearly appear from the follow

DETAILED DESCRIPTION

Carabiners used in climbing are used to connect at least two devices together, for a user's safety. They may for example be used to connect the bridging hasp of a rope harness and a belay system.

Figure 1:
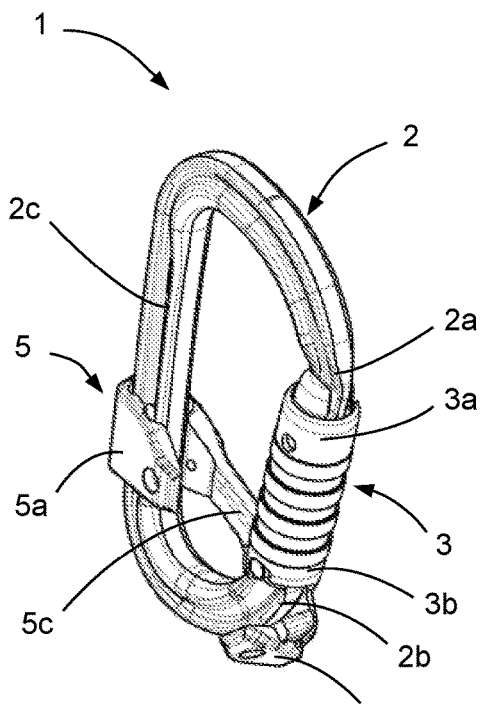
- FIG. 1 illustrates the way in which the bar is clipped onto the metal body of the carabiner.
Figure 2:
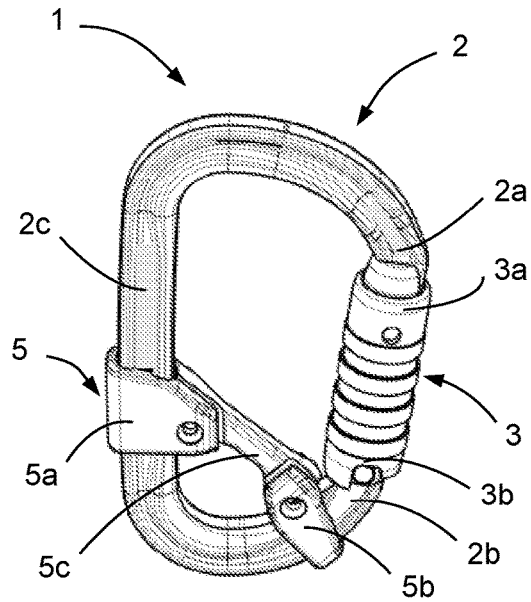
FIG. 2 shows the carabiner after the bar has been installed.

A carabiner 1, such as that shown in FIGS. 1 and 2, comprises a C-shaped metal body 2 and a rotatably-assembled gate 3 intended to close the carabiner. A first end 3a of gate 3 is rotatably assembled at the level of a first end 2a of metal body 2 along an axis orthogonal to a plane defined by carabiner 1, for example, metal body 2 or the plane containing the gate motion. A second end 3b of gate 3 is in contact with a second end 2b of metal body 2 when carabiner 1 is in closed position. Gate 3 may also take multiple opening positions to enable to introduce a belay device or a rope, for example. The maximum opening position corresponds to that where second end 3b of gate 3 can touch a central portion 2c of metal body 2. A pull-back spring (not shown) takes gate 3 back to the closed position of carabiner 1, so that, when no outer force is applied, carabiner 1 is in closed position.

Figure 5:
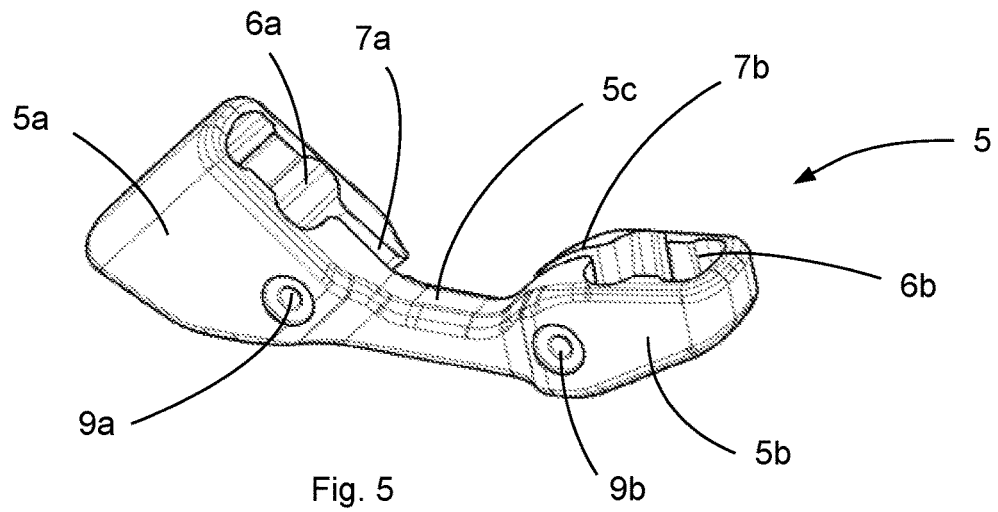

Generally, the shape of a carabiner 1 is adapted for a given use, and it generally does not have a plane of symmetry which is secant to the previously-defined plane. Thus, the connection between a carabiner 1 and a safety device 4 (such as the belay device shown in FIG. 5) should be formed in a specific area of carabiner 1 to use it in optimal security conditions.

To confine safety device 4 in a predefined area, a bar 5 is fastened to body 2 of carabiner 1, advantageously by clipping. The clipping is performed at least at one of the ends of bar 5 to fasten it to metal body 2. In other words, separation bar 5 is fastened to body 2 and defines two distinct confinement areas.

Bar 5 is preferably formed in one piece to have an improved compactness.

Bar 5 comprises a first fastener 5a placed at a first end and a second fastener 5b placed at a second opposite end. First and second fasteners 5a and 5b are separated by a central portion 5c and surround a section of body 2.

First fastener 5a and/or second fastener 5b totally surround metal body 2. By totally surrounding the metal body, the fastener is stronger and its lifetime is improved. If the two fasteners totally surround the metal body, the rotation of the bar relative to the carabiner is impossible in use.

According to a particular embodiment (not shown), the central portion 5c may have a U shape, and the first and second fasteners 5a and 5b may be sufficiently large, so as to confine the safety device 4 in a sufficiently small area to prevent its movement along the body 2. The safety device is then rotatably movable relative to the body 2.

An alternative embodiment may consist in using a separation bar 5 having a flat central portion 5c and fasteners 5a and 5b such as those shown in the figures, and adding a removable part, mounted both on separation bar 5 and body 2, so as to prevent lateral movement of the safety device 4 and to enable its rotational movement relative to the body 2.

The use of a one-piece fastener provides a better compactness than a fastener for example formed in two portions or more, for example, two half-shells.

First and/or second fasteners 5a, 5b are preferably one-piece, which enables to increase the strength of the bar, and more particularly of the fastener, and also to make the assembly of the bar easier by increasing the compactness.

Figure 3:
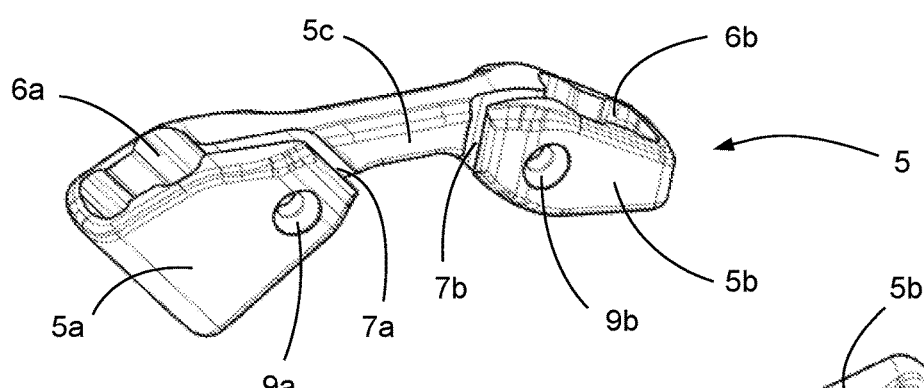
FIGS. 3 to 5 show the clip-on bar in detailed fashion.
Figure 4:
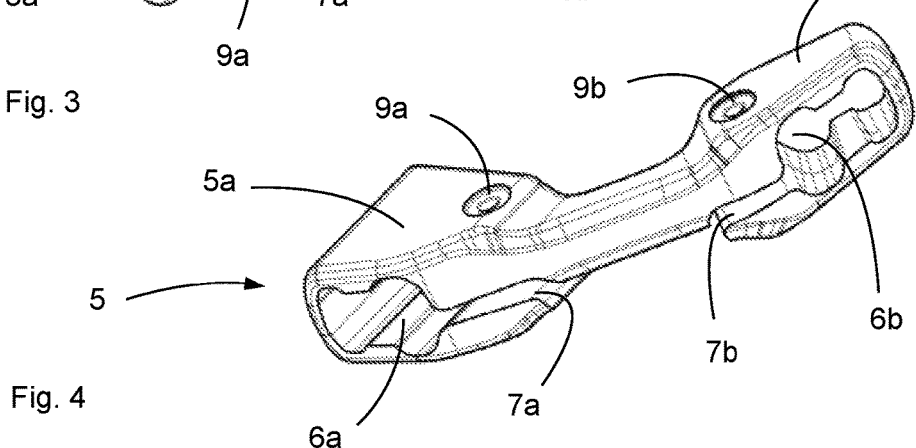

First fastener 5a advantageously comprises a first hollow section 6a and a first entrance 7a enabling to introduce metal body 2 all the way into first hollow section 6a. Similarly, it is advantageous to provide for second fastener 5b to comprises a second hollow section 6b and a second entrance 7b enabling to introduce metal body 2 into second hollow section 6b (see FIGS. 3 to 5). The two fasteners are each advantageously configured to clip the bar to body 2 by elastic deformation. Advantageously, first and second entrances 7a and 7b are defined by slots in a ring totally surrounding the metal body. The two slots define two planes which are preferably coplanar, and more preferably both located on the same side with respect to the median plane of bar 5, that is, both on the same surface of bar 5.

Advantageously, the first and/or the second fasteners are configured to plastically deform and thus enable to introduce the metal body through the slot.

The use of a first and/or of a second deformable fasteners provided with a slot is particularly advantageous since this makes the forming of a one-piece fastener easier.

If a slot is used, it is particularly advantageous to place the slot at the surface of the inner portion of body 2 of the carabiner, that is, in the inner portion of the space defined by body 2. It has been observed that the placing of the slot on the outer portion of metal body 2 results in an accelerated weakening of the bar since the slot receives many impacts during its use.

In closed position, it is advantageous to provide for the two sides of the slot to be in contact for a better mechanical performance.

Figure 6:
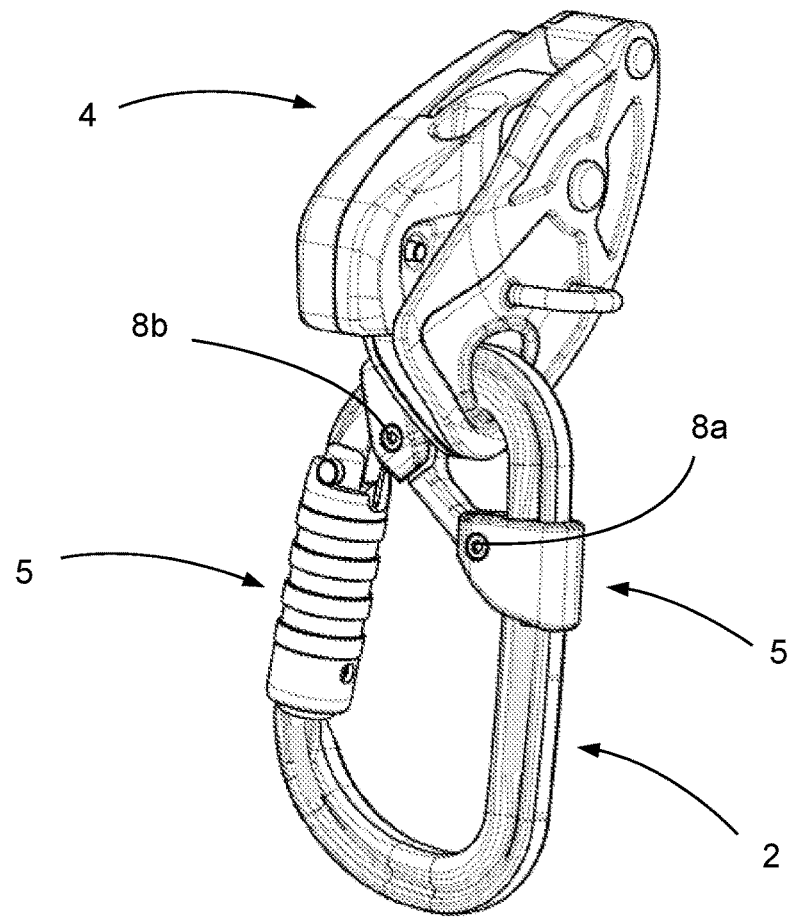
FIG. 6 shows a belay system provided with a carabiner according to the invention.

To avoid any untimely opening of the first and/or of the second fasteners of bar 5 on metal body 2, each entrance 7a and 7b may be kept closed by at least one connection element 8 (see FIG. 6). The connection element may for example be a clip clasping the outer surfaces of bar 5 in the vicinity of entrances 7a and 7b (embodiment not shown).

Advantageously, first and/or second through holes 9a and 9b may be formed in the vicinity of first and second entrances 7a and 7b, so that first and/or second connection elements 8a and 8b (see FIG. 6) such as screws, rivets, or self-clinching studs can cooperate with the first and second through holes 9a and 9b and prevent any unintentional opening of entrances 7a and 7b and firmly hold the bar on body 2. In a specific embodiment, first and second connection elements 8a and 8b extend along the entire length of first and second through holes 9a and 9b. First and second through holes 9a and 9b may also have axes of revolution respectively orthogonal to first and second entrances 7a and 7b. When entrances 7a and 7b are coplanar, first and second through holes 9a and 9b may be orthogonal to this plane.

The closing of first and second entrances 7a and 7b enables to firmly hold bar 5 on metal body 2, and to avoid any unexpected unclipping which may result in a misuse of the device connected to carabiner 1.

As an alternative embodiment which may be combined with the previous embodiments, the fastener provided with a deformable entrance, for example, a slot, may also be provided with a clipping system with a protruding area formed on a first side of the slot and a hole formed in the second side of the slot and cooperating with the protruding area to provide the closing of the slot by clipping. The clipping system may be configured to form a hard point easing the holding of the closed position or also to definitively close the fastener.

In an alternative embodiment, first fastener 5a or second fastener 5b is formed by a ring comprising no means for opening said ring. In this case, the ring is not deformable and the fastener is assembled first in the carabiner. In other words, the bar comprises at least one openable fastener to make the introduction of the metal body easier while using a rigid bar.

According to embodiments, the first and second fasteners may deform on the same side for the introduction of the carabiner body. This embodiment is illustrated in the drawings. As a variation, the first and second fasteners may deform along opposite directions, the bar is then placed in the inner space defined by body 2 with the clipping.

First and/or second fasteners 5a, 5b may comprise means for preventing the rotation of bar 5 relative to metal body 2. Thereby, the fastener intrinsically opposes the rotation of bar 5 without particularly stressing the central portion of the bar or the opposite fastener.

The use of one or two fasteners provided with anti-rotation means enables to reinforce the mechanical strength of the bar.

In an advantageous embodiment, the shape of first and/or second hollow sections 6a and 6b may be complementary to that of metal body 2. This may be particularly advantageous when the cross-section of metal body 2 is not circular, as in the embodiment illustrated in FIGS. 1, 2, and 6. It should also be noted that fasteners 5a and 5b do not bear against gate 3.

In an alternative embodiment, the anti-rotation means are configured to allow a rotation in an angular range substantially equal to 10° to allow the assembly of the bar on a larger number of carabiners.

After having been positioned in first and second hollow sections 6a and 6b, metal body 2 is surrounded with first and second fasteners 5a and 5b. The latter have the property of preventing the rotation of bar 5 relative to metal body 2. To achieve this, the inside of first and second hollow sections 6a and 6b may for example be covered with a non-skid film or with roughnesses intended to prevent motions of bar 5 relative to metal body 2.

Bar 5 is never connected to gate 3. Thereby, the two distinct areas defined by bar 5 are kept even when carabiner 1 is in open position.

The shape of the bar is advantageously adapted to the shape of the metal body 2 to which it is fastened. Thus, when metal body 2 does not have a symmetrical shape, bar 5 may be assembled on metal body 2 in a single location. A single assembling position is possible.

So that bar 5 can be clipped without undergoing a plastic deformation likely to weaken it, it is advantageous to select a material having an adapted deformation-at-failure value, for example, at least 50%.

The material forming the bar is advantageously selected from among injectable thermoplastic materials and may more particularly be polyamide. The clipping of bar 5 may thus be performed by elastic deformation of the two fasteners 5a and 5b, to install or uninstall the bar on metal body 2.

According to another advantageous aspect, bar 5 does not hinder the opening of carabiner 1 by limiting the rotation amplitude of gate 3. When locking element 3 is stopped against central portion 2c of metal body 2, it simultaneously bears against central portion 5c of bar 5. The latter then plays the role of a bearing point for gate 3, which may ease the handling of carabiner 1, for example, when the user can only use one hand to connect carabiner 1 to an outer element such as a belay station.

The invention also relates to a belay system comprising a belay device 4 and a carabiner 1 having the characteristics just described (see FIG. 6). The invention may for example be used in the context of a professional use for abseiling in urgent conditions. In this case, a rope may be permanently positioned in belay device 4, and the latter may be placed on carabiner 1 before bar 5 is fastened to metal body 2. The user can thus have at hand equipment ready to be used in case of need.

In order for the user to correctly install safety device 4 on carabiner 1, the following steps should be carried out:
  providing safety device 4 assembled on carabiner 1, the carabiner passing through a connection hole of the safety device,
  introducing metal body 2 through first and second entrances 7a and 7b, until metal body 2 is positioned in first and second hollow sections 6a and 6b (see FIG. 1), to clip bar 5 onto carabiner 1 and confine safety device 4 in a predefined area,
  closing first and second entrances 7a and 7b by means of at least a first and a second connection elements 8a and 8b.

Particularly advantageously, the safety device is associated with the carabiner before clipping bar 5 on body 2. In a specific embodiment, one of the fasteners is associated with body 2 before assembling the safety device. The fastening of the other fastener is performed after having assembled the safety device.

By following these different steps, safety device 4 is kept in the area most adapted to guarantee the user's safety.

Conversely to prior art bars, bar 5 is added onto metal body 2, which eases the method of manufacturing carabiner 1 and avoids a weakening thereof due to the piercing of fastening holes in body 2.

These different steps may also be carried out to install a safety device 4 such as a belay device, a lanyard, a pulley, or an ascender.

The invention claimed is:

1. A carabiner, comprising:
  a metal body,
  a gate rotatably assembled to a first end of the metal body between a closed position and an open position of the carabiner, the gate being in contact with a second end of the metal body when the carabiner is in closed position,
  a separation bar fastened to the metal body and configured to define two distinct confinement areas,
  wherein
  the separation bar is assembled by clipping onto the metal body at first and second opposite ends of the separation bar, the first end comprising a first fastener totally surrounding the metal body, and the second end comprising a second fastener surrounding the metal body,
  the separation bar being configured to authorize the opening of the gate when the first and second fasteners surround the metal body.

2. Carabiner according to claim 1, wherein the first and/or the second fasteners are one-piece.

3. Carabiner according to claim 1, wherein the first and/or second fasteners are anti-rotative fasteners so as to prevent rotation of the separation bar relative to the metal body.

4. Carabiner according to claim 3, wherein the first and/or second fasteners respectively comprise first and second hollow sections having a shape complementary to a shape of the metal body.

5. Carabiner according to claim 1, wherein the first fastener comprises:
- a first hollow section and
- a first elastic deformable entrance to introduce the metal body into the first hollow section of the first fastener and to allow a clipping of the separation bar onto the metal body.

6. Carabiner according to claim 5, wherein the separation bar comprises at least one first hole having an axis orthogonal to the first entrance and wherein the carabiner comprises at least one first connector cooperating with the first hole to close the first entrance and firmly hold the separation bar on the metal body.

7. Carabiner according to claim 6, wherein the first entrance is defined by a slot facing an inner portion of the metal body.

8. Carabiner according to claim 6, wherein the second fastener comprises:
- a second hollow section, and
- a second elastic deformable entrance to introduce the metal body into the second hollow section of the second fastener to allow a clipping of the separation bar onto the metal body.

9. Carabiner according to claim 8, wherein the separation bar comprises at least one second hole having an axis orthogonal to the second entrance and wherein the carabiner comprises at least one second connector cooperating with the second hole to close the second entrance and firmly hold the bar on the metal body.

10. Carabiner according to claim 9, wherein the first and second connectors are selected from among screws, rivets, or self-clinching studs.

11. Carabiner according to claim 10, wherein a protruding area is arranged on a first side of the first and/or second entrances and configured to cooperate with a hole arranged in a second opposite side of the first and/or second entrances to close the first and/or second entrances by clipping.

12. Carabiner according to claim 1, wherein the second fastener is a ring.

13. Carabiner according to claim 1, wherein the separation bar comprises a central portion connecting the first and second fasteners, the central portion being configured so that the gate can bear against the central portion when the gate abuts against a central portion of the metal body.

14. Belay system comprising a carabiner according to claim 1 and a safety device.

15. Method of installing a safety device on the carabiner according to claim 1, comprising the steps of:
- providing the carabiner connected to a connection hole of the safety device,
- introducing the metal body into the first and second fasteners to clip the separation bar onto the carabiner and confine the safety device in a predefined area.

16. Method according to claim 15, further comprising:
- closing the first and second fasteners by means of connectors.

* * * * *